(12) United States Patent
Yano et al.

(10) Patent No.: US 6,296,969 B1
(45) Date of Patent: Oct. 2, 2001

(54) SEPARATOR FOR BATTERY HAVING A FUNCTION OF AVOIDING DANGERS CAUSED BY OVERHEAT, AND METHOD FOR PRODUCING THE SAME

(75) Inventors: Kenji Yano; Misao Iwata; Hirokazu Matsunaga, all of Nagoya; Yukio Shibata; Yoshio Tanimizu, both of Kyoto, all of (JP)

(73) Assignees: Noritake Co., Ltd., Nagoya; Sanyo Chemical Industries, Ltd., Kyoto, both of (JP)

( * ) Notice: Subject to any disclaimer, the term of this patent is extended or adjusted under 35 U.S.C. 154(b) by 0 days.

(21) Appl. No.: 09/277,742

(22) Filed: Mar. 29, 1999

(30) Foreign Application Priority Data

Mar. 30, 1998 (JP) .................................................. 10-103638

(51) Int. Cl.$^7$ ...................................................... H01M 2/16
(52) U.S. Cl. ......................... 429/145; 429/144; 429/249; 429/251
(58) Field of Search .................................. 429/249, 251, 429/144, 145; 282/62.2

(56) References Cited

U.S. PATENT DOCUMENTS

| | | | |
|---|---|---|---|
| 5,102,745 | * | 4/1992 | Tatarchuk et al. .................... 428/605 |
| 5,989,750 | * | 11/1999 | Ohba et al. ............................ 429/251 |

FOREIGN PATENT DOCUMENTS

| | | | |
|---|---|---|---|
| 56-59456 | | 5/1981 | (JP) . |
| 2-204373 | * | 8/1990 | (JP) . |
| 5-25305 | | 2/1993 | (JP) . |
| 5-55975 | | 8/1993 | (JP) . |
| 5-55977 | | 8/1993 | (JP) . |
| 7-183021 | | 7/1995 | (JP) . |
| 8-111214 | | 4/1996 | (JP) . |
| 8-138643 | | 5/1996 | (JP) . |

OTHER PUBLICATIONS

English Abstract of JP 56–59456, May 22, 1981, Tetsuo Kawai, Hitachi Maxell, Ltd.
English Abstract of JP 5–55975, Aug. 18, 1993, Yoshiteru Miwa, et al., Nippon Sheet Glass Co., Ltd.
English Abstract of JP 5–55977, Aug. 18, 1993, Yoshiteru Miwa, et al., Nippon Sheet Glass Co., Ltd.

* cited by examiner

*Primary Examiner*—Laura Weiner
(74) *Attorney, Agent, or Firm*—Oblon, Spivak, McClelland, Maier & Neustadt, P.C.

(57) ABSTRACT

To provide a separator for a battery with high safety and a method for producing the same in which the separator has a shutdown function and capability of preventing meltdown, complete melting and cracks when the battery performs unusually. This separator comprises a porous ceramic sheet having ceramic fibers bonded to each other at their intersection points and polyolefin and comprises micropores for impregnation of an electrolyte.

29 Claims, 1 Drawing Sheet

SEPARATOR FOR BATTERY HAVING A FUNCTION OF AVOIDING DANGERS CAUSED BY OVERHEAT, AND METHOD FOR PRODUCING THE SAME

BACKGROUND OF THE INVENTION

1. Field of the Invention

The present invention relates to a separator for a battery and a method for producing the same, more particularly to a separator for a battery having a function for avoiding dangers caused by overheat of a high-performance battery such as a lithium battery, etc., and having excellent film shape maintaining properties even at a high temperature.

2. Description of the Related Arts

In recent years, a compact battery of high performance has been required as a portable compact device such as a lap top computer, a mobile telephone, a VTR camera, and a liquid crystal television, is developed. In accordance with this, a lithium battery comes to public notice and is practically used since it has a high electromotive force, a high energy, a small self discharge, and the like.

The battery generally has a separator for preventing a short circuit between positive and negative electrodes. A polyolefin-based organic porous film is used as a separator in the lithium battery in practical use at present (Japanese Laid-Open Patent Publication Nos. 5-25305 and 8-138643).

The polyolefin-based organic porous film is used to restrain a battery reaction when the battery performs unusually. Namely, when a large electric current flows through the lithium battery caused by an external short circuit, a misconnection of the positive and negative electrodes, etc., the lithium battery is heated and an internal temperature of this battery is excessively increased. At this time, this organic porous film is melted and its micropores are clogged, thereby preventing migration of ions in an electrolyte. Thus, the battery reaction is stopped and further heating is restrained.

Such a function is called a shutdown function and is indispensable to the separator of a lithium battery. The lithium battery is designed such that the shutdown function is fulfilled at a temperature close to 130° C. when using polyethylene and a temperature close to 160° C. when using polypropylene as the separator.

However, this shutdown state can be continuously maintained only when micropores of the separator are clogged by a melted substance of polyolefin as a material of the separator. When a large heating state is continued, the separator is completely melted, so that the electrodes come in contact with each other and a short circuit current flows through the inside of the battery. Thus, there is a danger that the heating state is further continued and the battery is further overheated.

As mentioned above, the state in which the separator is completely melted is called meltdown.

As disclosed in Japanese Laid-Open Patent Publication No. 8-111214, a separator for a battery comprising a laminated structure of a glass porous body and a polyolefin porous body is proposed so as to prevent this meltdown.

However, in this case, when the temperature of a resin layer (polyolefin) attains to a complete melting temperature, an internal pressure of the battery is increased and force for expanding the glass porous body is applied thereto. Since the glass porous body used here is a nonwoven fabric of glass fibers, the glass fibers are simply entwined with each other. Therefore, the clearances between the fibers are increased and cracks generate, resulting in a flowing of a short circuit electric current through the battery and also overheat of the battery.

SUMMARY OF THE INVENTION

In consideration of such conventional problems, the present invention provides a separator for a battery with high safety and a method for producing the same in which the separator has a shutdown function and capability of preventing meltdown, complete melting and cracks when the battery performs unusually.

The present invention is a separator for a battery comprising a porous ceramic sheet having ceramic fibers bonded to each other at their intersection points and polyolefin and comprising micropores for impregnation of an electrolyte.

In the separator for the battery of the present invention, when the battery is heated by an external short circuit, etc., a porous ceramic sheet is clogged by melting polyolefin at a temperature close to a melting point of polyolefin, and thus an electric current is shut down.

In addition, the ceramic fibers have heat resistance and are bonded to each other at their intersection points, even when the battery temperature further rises and polyolefin attains to a complete melting state. Thus, the separator for the battery is maintained in a sheet shape as it is and does not swell as in a case using the nonwoven fabric of glass fibers shown in the conventional arts described above. Accordingly, no cracks generate in the separator for the battery. Namely, an original film shape is maintained and the shutdown function of the separator for the battery is continued even when the above meltdown occurs. Therefore, the separator has excellent safety.

Thus, in accordance with the present invention, it is possible to provide a separator for a battery with high safety and a method for producing the same in which the separator has the shutdown function and capability of preventing meltdown, complete melting and cracks when the battery performs unusually.

DETAILED DESCRIPTION OF THE INVENTION

Figure 1:
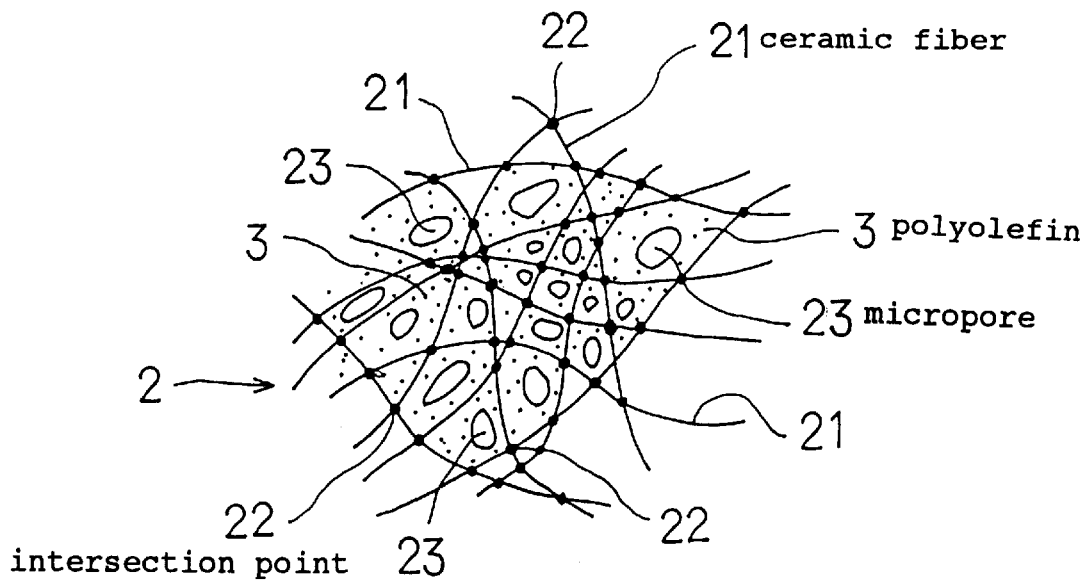
FIG. 1 is an explanatory view of a separator for a battery according to Embodiment 2.

The separator for a battery of the present invention comprises a porous ceramic sheet having ceramic fibers bonded to each other at their intersection points and polyolefin and comprises micropores for impregnation of an electrolyte.

The ceramic sheet is preferably constituted by sintering the ceramic fibers to each other at their intersection points.

In this case, since the ceramic fibers are bonded to each other by sintering at their intersection points, no ceramic fibers are separated from each other during use of the separator for the battery. Accordingly, the separator for the battery can be maintained in its initial state and have an excellent durability. The bonding of the ceramic fibers by sintering, as described later, can be achieved by calcining the ceramic fibers, so that the separator can be easily produced.

It is preferable to treat a surface of the ceramic sheet with a silane coupling agent.

In this case, affinity of the ceramic sheet and polyolefin is increased and thus an adhesive property is improved. Accordingly, it is possible to form a separator for the battery easily undamaged and improve safety of the battery.

Namely, a lipophilic treatment of the ceramic sheet is performed by using the silane coupling agent such as γ-methacryloxypropyl trimethoxysilane, amino propyl trimethoxysilane, vinyl trimethoxysilane, followed by a composite processing with polyolefin. When such a lipophilic treatment is performed, the adhesive property of the ceramic sheet and polyolefin is improved, so that damage of the separator for the battery is reduced and safety of the battery is preferably improved.

It is also preferable to bond the ceramic sheet and polyolefin to each other directly, or through the silane coupling agent.

Namely, it is preferable that the polyolefin is chemically bonded to the ceramic sheet. In this case, it is possible to prevent the polyolefin from flowing out due to complete melting, leading to further improved safety of the battery.

For example, such chemical bonding can be directly formed by reacting an —OH group (hydroxyl group) on a ceramic fiber surface with a carboxyl group, a dicarboxylic acid anhydride group, an epoxy group, etc. in denatured polyolefin in polyolefin.

The ceramic sheet preferably bonds to the polyolefin through a silane coupling agent. Namely, the chemical bonding can be also formed through the silane coupling agent by previously treating the ceramic fiber surface by the silane coupling agent, and then similarly reacting the carboxyl group, the carboxylic acid anhydride group, the epoxy group and the like in the denatured polyolefin with an amino group of the silane coupling agent.

When the ceramic sheet and polyolefin are chemically bonded to each other directly or indirectly in this manner, both the ceramic sheet and polyolefin are integrated with each other so that a further preferable shutdown function is continued.

It is also preferable to hold the polyolefin within the clearances between the ceramic fibers in the ceramic sheet.

In this case, an excellent shutdown function can be maintained for a longer time period.

The ceramic fibers are preferably constituted of amorphous silica fibers and fibers for reinforcement formed by one or more kinds of alumina fibers, aluminosilicate fibers and aluminoborosilicate fibers.

In this case, since the amorphous silica fibers are used as the ceramic fibers and have an excellent flexibility, ceramic fibers having an excellent flexibility can be obtained. Further, as the amorphous silica fibers is slightly low in its strength, this strength can be reinforced by the above fibers for reinforcement.

Therefore, a separator for the battery excellent in flexibility and strength can be obtained.

A micropore for impregnation of an electrolyte of the separator for a battery is preferably 0.05 $\mu$m or more, and more preferably 0.2 $\mu$m or more in view of its functions for impregnation with the electrolyte. It is also preferably 3 $\mu$m or less, more preferably 1 $\mu$m or less in view of excellent resistant to leakage and short circuit of the separator for the battery.

A method for producing the above separator for the battery will next be explained.

Thus, there is a method for producing the separator for the battery comprising a porous ceramic sheet having ceramic fibers bonded to each other at their intersection points and comprising micropores for impregnation of an electrolyte, which comprises forming a porous ceramic sheet by calcining a mixture of ceramic fibers and a boron compound, and adding polyolefin to the ceramic sheet.

According to this method, the separator for the battery having the above excellent performance can be obtained easily and reliably.

Examples of the ceramic fibers in the present invention are amorphous silica fibers, aluminosilicate fibers, aluminoborosilicate fibers, and the like. Among these fibers, the amorphous silica fibers are preferable as the separator for the battery in terms of their flexibility.

When the amorphous silica fibers are heated, they are crystallized and become crystobalite, resulting in degradation of strength and flexibility of these fibers themselves. Thus, it is particularly important to add the boron compound as a crystallization restraining agent of the amorphous silica fibers to the amorphous silica fibers. This boron compound reacts with silica in the amorphous silica fibers and generates borosilicate and has a function for fusion bonding the fibers to each other.

The ceramic fiber preferably has a diameter of 0.65 $\mu$m or more, and more preferably of 1 $\mu$m or more in view of an excellent strength of the ceramic sheet. The diameter is also preferably 10 $\mu$m of less, and more preferably 6 $\mu$m or less in view of excellent flexibility of the ceramic sheet. The ceramic fiber preferably has a length of 1 mm or more, particularly 3 mm or more in view of excellent strength of the separator for the battery. The length is also preferably 30 mm or less, and more preferably 15 mm or less in view of excellent moldability of the ceramic sheet.

Examples of the polyolefin are polymers (copolymers) consisting of one or more kinds selected from ethylene, propylene and α-olefin of carbon number 4 or more.

Among these polymers (copolymers), polyethylene, polypropylene, ethylene-propylene copolymer, ethylene-butene copolymer, ethylene-hexene copolymer and ethylene-octene copolymer are desirable in view of molding processability and economical efficiency.

No molecular weight of the polyolefin is particularly limited, but it is preferable to set a number average molecular weight of the polyolefin to twenty thousand or more, in view of an excellent resin property of the polyolefin as a polyolefin film having a thickness of about 20 $\mu$m after the polyolefin is compounded with the ceramic sheet.

These polyolefins are, in view of an excellent strength of the separator for a battery, preferably constituted by denaturing polyolefin with acid value 20 as an upper limit, or using a blend of polyolefin denatured in advance. Since the denatured polyolefin exists within the separator for the battery, an adhesive property of polyolefin and the ceramic sheet is further strengthened. Preferable examples of the denatured polyolefin include: polyolefin such as ethylene polymers (such as copolymers constituted of high density polyethylene, medium density polyethylene, low density polyethylene or ethylene and other one or more of other α-olefins of carbon number 4 to 12), propylene polymers (such as copolymers constituted of polypropylene or propylene and other one or more of vinyl compounds) and ethylene propylene copolymers, polybutene and poly-4-methylpentene-1, being denatured by graft polymerization, block copolymerization or the like with unsaturated dicarboxylic acid or its derivatives (dicarboxylic acid and its anhydride such as maleic acid, itaconic acid and citraconic acid, esterified materials of maleic butyl and the like), epoxy group-containing vinylic compounds (such as glycidyl methacrylate) or the like. Among these, such that are further preferable are ethylene polymers, propylene polymers and ethylene-propylene copolymers, which are graft denatured with maleic anhydride and/or glycidyl methacrylate.

While the denaturing degree can be suitably set, preferably it ranges from 0.1 to 20 by acid value of polyolefin to be provided with the separator. Controlling the acid value within this range enables to obtain a separator for a battery having an excellent strength.

For example, the mixture of ceramic fibers and a boron compound is obtained by dispersing the ceramic fibers and power of the boron compound into water, followed by mixing, and forming a paper-like sheet by laminating the ceramic fibers with each other at random from this dispersing liquid by a method such as a wet paper method.

In view of an excellent progress of sintering, this mixture is heated to preferably 1200° C. or higher, and more preferably 1250° C. to form a porous ceramic sheet. In view of an excellent sintering effect, the mixture is heated to preferably 1400° C. or lower, and more preferably 1350° C. or lower to form a porous ceramic sheet.

Addition of polyolefin to the porous ceramic sheet obtained in this manner is performed to obtain a separator for the battery comprising both the ceramic sheet and polyolefin and having micropores.

As a method for adding polyolefin to the porous ceramic sheet, there is the following method.

Namely, there is a method in which the porous ceramic sheet is dipped into a polyolefin dissolved or dispersed liquid, thereby dipping polyolefin into the ceramic sheet. In another method, a thermally contact-bonding of a polyolefin-based thin resin film which is added a plasticizer thereto with one or both faces of the ceramic sheet is performed to obtain a composite sheet of the ceramic sheet and polyolefin.

In this case, a polyolefin portion must have a microporous structure to function as the separator for the battery. In order to provide the microporous structure, there is a method for including an inorganic fine powder body and/or a plasticizer as a pore forming agent within the above polyolefin. In this case, a technique (e.g., Japanese Laid-Open Patent Publication Nos. 8-138643, 5-25305, etc.) in which the pore forming agent is extracted and removed after molding the separator for the battery is employed.

As the pore forming agent, substances such as a fine powder silicic acid, calcium silicate, calcium carbonate, fine powder talc, DBP (dibutyl phthalate), DOP (dioctyl phthalate), DNP (dinonyl phthalate), DBS (dibutyl sebacate), TBP (tributyl phosphate), liquid paraffin and the like can be used.

As the boron compound, various kinds of boron compounds can be employed. The boron compound is preferably a nonmetal-based boron compound because a metallic boron compound may cause to crystallize amorphous silica fibers as well as to prevent fusion bonding of these fibers.

Examples of the nonmetal-based boron compound are boron oxide ($B_2O_3$), boron nitride (BN), boron carbide ($B_4C$), silicon boride ($SiB_4$, $SiB_6$), and the like. In these compounds, it is preferable to use the boron nitride in view of the practical industrial production.

As mentioned above, the boron compound such as the boron nitride to be added as a crystal restraining agent is oxidized at calcination times of the mixture of ceramic fibers and a boron compound at 1200 to 1400° C., and forms borosilicate and aluminoborosilicate so that contact interfaces of the ceramic fibers are fusion bonded to each other.

Therefore, in view of appropriate maintaining of boron amount in the ceramic sheet, it is desirable to set the particle size of the boron compound powder approximately to a particle size for allowing an oxidizing reaction preferably at 900° C. or higher, and more preferably at 950° C. or higher. In view of an excellent resistance to crystallization of ceramic fibers, it is desirable to set the particle size of the boron compound powder approximately to a particle size for allowing an oxidizing reaction preferably at 1200° C. or lower, and more preferably at 1100° C. or lower.

3 to 7.5 wt % of the boron nitride with respect to a total weight of the ceramic fibers is added to the ceramic fibers. In view of strength of the ceramic sheet, the adding amount is preferably 3 wt % or grater, and more preferably 4 wt % or grater. In view of flexibility of the ceramic sheet, the adding amount is preferably 7.5 wt % or smaller, and more preferably 6.5 wt % or smaller.

The ceramic fibers are preferably constituted of amorphous silica fibers and fibers for reinforcement formed by one or more kinds of alumina fibers, aluminosilicate fibers and aluminoborosilicate fibers.

In this case, as mentioned above, it is possible to obtain a separator for a battery excellent in flexibility and strength.

In view of an excellent strength of the ceramic sheet, a mixing ratio of the amorphous silica fibers in the ceramic fibers is preferably 90 wt % or less, and more preferably 70 wt % or less. In view of an excellent flexibility, it is preferably 10 wt % or more, and more preferably 30 wt % or more.

Organic fibers may be mixed with the mixture of the ceramic fibers and the boron compound, and the organic fibers are preferably allowed to disappear during the calcination.

In this case, after the above mixture is molded in a sheet shape, strength of the molded sheet can be maintained until the calcination.

Examples of the organic fibers are pulp obtained from a needle-leaftree and a broadleaf tree, long fibers for Japanese paper such as a mitsumata, a paper mulberry, natural fibers such as hemp, cotton, and artificial fibers such as vinylon, nylon, acrylic, polyester, PVA (polyvinyl alcohol), etc.

5 to 40 wt % of the organic fibers with respect to a total weight of the ceramic fibers and the boron compound is preferably added thereto. In view of the strength of the ceramic sheet before the calcination, the adding amount is preferably 5 wt % or grater, and morepreferably10 wt % or grater. In view of void percentage of the ceramic sheet after the calcination, the adding amount is preferably 40 wt % or smaller, and more preferably 30 wt % or smaller.

In the above case, the ceramic fibers, the boron compound and the organic fibers are dispersed into water and are molded to the ceramic sheet by a method such as a wet paper method or a method similar to this.

As the wet paper method or the method similar to thereto, there is a method in which the above fiber dispersing liquid is flowed onto a filter medium such as a filter network, a filter cloth or a filter plate having a band shape, a circular shape, an angular shape and the like such that the fiber dispersing liquid has a uniform thickness. Otherwise, the fiber dispersing liquid is put between these filter media. Thereafter, the fiber dispersing liquid is filtered by an operation such as natural filtration or pressure reducing filtration, etc. so that a sheet-like molded material is formed.

Then, the sheet-like molded material is dried at 80 to 110° C. and is calcinated at 1200 to 1400° C. A holding time of the sheet-like molded material at a maximum temperature may be set to range from 10 to 60 minutes. An atmosphere during the calcination of the sheet-like molded material is preferably set to an oxidizing atmosphere so as to promote an oxidizing reaction of the boron compound such as boron nitride.

Such a separator for the battery in the present invention is used as, for example, a separator for a lithium secondary battery, a nickel cadmium battery, a nickel-hydrogen battery and the like.

EMBODIMENTS

Embodiment 1

The separator for a battery according to the present invention is described with references to Examples 1 to 8 and Comparative 1 hereinafter.

EXAMPLE 1

A separator for a battery was produced in various conditions, and its film thickness, tensile strength (MPa), air permeability (second/100 cc) and void percentage were measured. Each measuring method was described in Table 1.

2.12 g of amorphous silica fibers as ceramic fibers, 0.53 g of alumina fibers as fibers for reinforcement, 0.08 g of boron nitride and 1.18 g of pulp as organic fibers were dispersed into 50 g of ion exchanger water, and were molded in a circular sheet shape having a diameter of 230 mm and a thickness of 55 $\mu$m by a paper molding method, followed by drying at 100° C.

After this drying, the circular sheet was calcinated at 1300° C. for 30 minutes and a ceramic sheet A was obtained. The obtained ceramic sheet A had a diameter of 185 mm and a thickness of 42 $\mu$m, and was not folded even when the ceramic sheet was bent 180 degrees along a bar having 2 mm in radius. Accordingly, the ceramic sheet had a sufficient flexibility and strength in the treatments.

Next, 5.0 weight % of high density polyethylene powder as polyolefin, 2.4 weight % of silicic acid formed in a fine powder shape as a pore forming agent, 10.0 weight % of liquid paraffin and 82.6 weight % of xylene were sufficiently mixed with each other at 100° C. and the ceramic sheet A was dipped into the resultant mixed solution and then dried. This operation was repeated fifteen times and a composite body sheet was obtained. This composite body sheet was subjected to a heat treatment at 160° C. for twenty minutes. Thereafter, this composite body sheet was dipped into 1,1,1-trichloroethane for ten minutes and was further dipped into 25% of sodium hydroxide aqueous solution for 60 minutes at 60° C. so that the above fine powder silicic acid was eluted.

Thereafter, the composite body sheet was dried so that a separator for a battery having micropores each of which has a diameter from 0.05 to 0.5 $\mu$m was obtained. Properties of the obtained separator for the battery were provided as shown in Table 1.

EXAMPLE 2

2.12 g of amorphous silica fibers, 0.53 g of alumina fibers, 0.08 g of boron nitride and 1.18 g of pulp were dispersed into 50 g of ion exchanger water, and were molded in a circular sheet shape having a diameter of 230 mm and a thickness of 55 $\mu$m by a paper molding method, followed by drying at 100° C.

After this drying, the circular sheet was calcinated at 1300° C. for 30 minutes and a ceramic sheet A was obtained. The obtained ceramic sheet A had a diameter of 185 mm and a thickness of 42 $\mu$m, and was not folded even when the ceramic sheet was bent 180 degrees along a bar having 2 mm in radius. Accordingly, the ceramic sheet had a sufficient flexibility and strength in the treatments.

Then the ceramic sheet A was put between front and back faces of a film produced by high density polyethylene which had a thickness of 25 $\mu$m as being made into three-layered material. This film contained 22 weight % of silicic acid formed in a fine powder shape as a pore forming agent and 25 weight % of liquid paraffin. The obtained was then subjected to a press molding at 145° C., so that a composite body sheet was obtained.

Thereafter, this composite body sheet was dipped into 1,1,1-trichloroethane for ten minutes and was further dipped into 25% of sodium hydroxide aqueous solution for 60 minutes at 60° C. so that the fine powder silicic acid was eluted, followed by drying and a separator for a battery was obtained. The properties of the separator were provided as shown in Table 1.

EXAMPLE 3

2.12 g of amorphous silica fibers, 0.53 g of alumina fibers, 0.08 g of boron nitride and 1.18 g of pulp were dispersed into 50 g of ion exchanger water, and were molded in a circular sheet shape having a diameter of 230 mm and a thickness of 55 $\mu$m by a paper molding method, followed by drying at 100° C.

After this drying, the circular sheet was calcinated at 1300° C. for 30 minutes and a ceramic sheet was obtained. The obtained ceramic sheet had a diameter of 185 mm and a thickness of 42 $\mu$m, and was not folded even when the ceramic sheet was bent 180 degrees along a bar having 2 mm in radius. Accordingly, the ceramic sheet had a sufficient flexibility and strength in the treatments.

Next, γ-methacryloxypropyl trimethoxysilane soluble into water of pH from 3.5 to 4.0 was dissolved into water of pH 3.5 so that 0.5% of solution was formed, followed by hydrolyzing. The ceramic sheet was then dipped into this solution and water was sufficiently removed from the ceramic sheet. Thereafter, the ceramic sheet was dried at 130° C.

Then, a lipophilic treatment of the ceramic sheet was performed. The obtained ceramic sheet B had no clogging caused by a coupling material.

Then 4.5 weight % of high density polyethylene, 0.5 weight % of maleic anhydride graft high density polyethylene (acid value: 19), 2.4 weight % of silicic acid formed in a fine powder shape, 10.0 weight % of liquid paraffin and 82.6 weight % of xylene were sufficiently mixed with each other at 100° C. and the ceramic sheet B was dipped into the resultant mixed solution and then dried.

This operation was repeated fifteen times and a composite body sheet was obtained. This composite body sheet was subjected to a heat treatment at 160° C. for twenty minutes. Thereafter, this composite body sheet was dipped into 1,1,1-trichloroethane for ten minutes and was further dipped into 25% of sodium hydroxide aqueous solution for 60 minutes at 60° C. so that the above fine powder silicic acid was eluted, followed by drying and a separator for a battery was obtained. The properties of the separator were provided as shown in Table 1.

EXAMPLE 4

2.12 g of amorphous silica fibers, 0.53 g of alumina fibers, 0.08 g of boron nitride and 1.18 g of pulp were dispersed into 50 g of ion exchanger water, and were molded in a circular sheet shape having a diameter of 230 mm and a thickness of 55 μm by a paper molding method, followed by drying at 100° C.

After this drying, the circular sheet was calcinated at 1300° C. for 30 minutes and a ceramic sheet was obtained. The obtained ceramic sheet had a diameter of 185 mm and a thickness of 42 μm, and was not folded even when the ceramic sheet was bent 180 degrees along a bar having 2 mm in radius. Accordingly, the ceramic sheet had a sufficient flexibility and strength in the treatments.

Next, γ-methacryloxypropyl trimethoxysilane soluble into water of pH from 3.5 to 4.0 was dissolved into water of pH 3.5 so that 0.5% of solution was formed, followed by hydrolyzing. The ceramic sheet was then dipped into this solution and water was sufficiently removed from the ceramic sheet. Thereafter, the ceramic sheet was dried at 130° C.

Then, a lipophilic treatment of the ceramic sheet was performed. The obtained ceramic sheet B had no clogging caused by a coupling material.

Next, the ceramic sheet B was put between films produced by high density polyethylene including maleic anhydride graft ethylene-propylene copolymer, which had a thickness of 25 μm as being made into three-layered material. This high density polyethylene-made film contained 22 weight % of silicic acid formed in a fine powder shape and 25 weight % of liquid paraffin. The obtained was then subjected to a press molding at 145° C., so that a composite body sheet was obtained. This composite body sheet was dipped into 1,1,1-trichloroethane for ten minutes and was further dipped into 25% of sodium hydroxide aqueous solution for 60 minutes at 60° C. so that the fine powder silicic acid was eluted, followed by drying and a separator for a battery was obtained.

Properties of the obtained separator for the battery were provided as shown in Table 1.

EXAMPLE 5

A separator for a battery was obtained similarly as in Example 1 except that a solution for dipping the ceramic sheet thereinto was composed of 2.5 weight % of high density polyethylene, 2.0 weight % of ultra-high molecular weight polyethylene, 0.5 weight % of low density polyethylene, 2.4 weight % of silicic acid formed in a fine powder shape, 10.0 weight % of liquid paraffin and 82.6 weight % of xylene at a mixing temperature of 130° C.

Properties of the obtained separator for the battery were provided as shown in Table 1.

EXAMPLE 6

A separator for a battery was obtained similarly as in Example 1 except that a solution for dipping the ceramic sheet thereinto is composed of 5.0 weight % of ethylene-butene copolymer polymerized by using a metallocene catalyst, 2.4 weight % of silicic acid formed in a fine powder shape, 10.0 weight % of liquid paraffin and 82.6 weight % of xylene.

Properties of the obtained separator for the battery were provided as shown in Table 1.

EXAMPLE 7

A separator for a battery was obtained similarly as in Example 4 except for using a film produced by high density polyethylene which had 25 μm in thickness. This high density polyethylene-made film included 22 weight % of silicic acid formed in a fine powder shape and 25 weight % of liquid paraffin. The high density polyethylene includes one or more kinds selected from maleic anhydride graft ethylene-propylene copolymer, ultra-high molecular weight polyethylene, and low density polyethylene.

Properties of the obtained separator for the battery were provided as shown in Table 1.

EXAMPLE 8

A separator for a battery was obtained similarly as in Example 4 except for using a film produced by ethylene-butene copolymer which had 25 μm in thickness. This ethylene-butene copolymer-made film included 22 weight % of silicic acid formed in a fine powder shape and 25 weight % of liquid paraffin. The ethylene-butene copolymer is polymerized by using a metallocene catalyst and includes maleic anhydride graft ethylene-propylene copolymer.

Properties of the obtained separator for the battery were provided as shown in Table 1.

COMPARATIVE 1

24 weight % of high density polyethylene, 20 weight % of glass fibers having 7 μm in diameter, 18 weight % of silicic acid formed in a fine powder shape and 38 weight % of liquid paraffin were melted and kneaded in a glass nonwoven fabric in which no fibers were bonded to each other, and the resultant was then molded in a sheet shape having thickness of 40 μm.

The molded sheet was dipped into 1,1,1-trichloroethane for ten minutes and was further dipped into 25% of sodium hydroxide aqueous solution at 60° C. for 60 minutes so that the fine powder silicic acid was eluted. Thereafter, the sheet was dried and a separator for a battery was obtained.

Properties of the obtained separator for the battery were provided as shown in Table 1.

TABLE 1

Properties of Separator for Battery

| | Film thickness (μm) | Tensile Strength*1 (MPa) | Air permeability*2 (sec/100 cc) | Void content*3 (%) |
|---|---|---|---|---|
| Example 1 | 44 | 60 | 520 | 47 |
| Example 2 | 45 | 61 | 540 | 43 |
| Example 3 | 45 | 66 | 540 | 46 |
| Example 4 | 46 | 69 | 530 | 43 |
| Example 5 | 45 | 71 | 520 | 44 |
| Example 6 | 45 | 62 | 520 | 42 |
| Example 7 | 45 | 60 | 510 | 44 |
| Example 8 | 46 | 61 | 530 | 44 |
| Comparative 1 | 38 | 52 | 540 | 47 |

*1: according to ASTM D882
*2: according to JIS P8117
*3: calculated from
[100 x (water content weight - absolute dry weight)/sample volume] of a sample of 5 cm × 5 cm Embodiment 2

A coin-type lithium battery was produced by using each of the separators in Examples 1 to 8 and Comparative 1 produced as mentioned above, and whether this coin-type lithium battery had shutdown breakdown or not was examined.

As shown in FIG. 1, the ceramic sheet according to the present invention is constituted of a porous ceramic sheet formed by bonding many ceramic fibers 21 to each other at their intersection points 22, and polyolefin 3 adhered to these ceramic fibers. Further, many micropores 23 are formed between these ceramic fibers 21 or the polyolefin 3.

Figure 2:
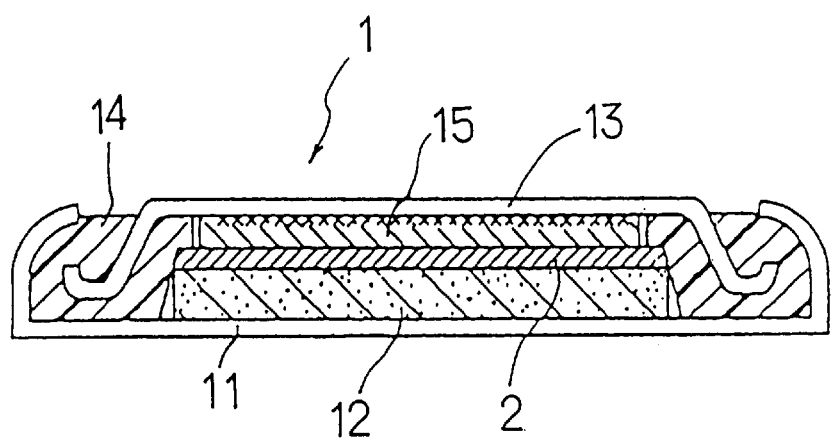
FIG. 2 is a cross-sectional view of a coin-type lithium battery according to Embodiment 2.

As shown in FIG. 2, in the coin-type lithium battery 1, a positive electrode 12 is arranged below the separator 2 for the battery and a negative electrode 15 is arranged on the separator 2. A positive electrode can 11 is arranged on a side of the positive electrode 12 and a negative electrode terminal plate 13 is arranged on a side of the negative electrode 15. An electric insulating gasket 14 in a ring shape is provided between the positive electrode can 11 and the negative electrode terminal plate 13.

The positive and negative electrodes of the battery produced above and the electrolyte are provided as follows.

For producing the positive electrode 12, a lithium cobalt composite oxide, polyvinylidene fluoride and acetylene black were formed in a paste state and an aluminum foil having a thickness of 20 µm was coated with this paste. This aluminum foil was then dried and rolled and was cut out in a circular-shaped piece having a diameter of 15 µm, and the obtained was used as the positive electrode 12.

For producing the negative electrode 15, graphite and polyvinylidene fluoride were formed in a paste state and both faces of a copper foil having a thickness of 10 µm were coated with this paste. This copper foil was then dried and rolled and was cut out in a circular-shaped piece having a diameter of 15 mm, and the obtained was used as the negative electrode 15.

For the electrolyte, a mixing liquid of ethylene carbonate and diethylcarbonate in a volume ratio of 1:1 which included 1 mol/liter of $LiPF_6$ was used.

A safety test was made using this battery.

In a testing method, an external short circuiting operation was performed by a testing circuit having 50 mΩ in resistance at a short circuiting time. Aratio (%) of batteries broken or destroyed with a shutdown temperature and a shutdown state not maintained nor continued at this time was measured.

In Examples and Comparative, the each battery was charged for five hours in a condition of a constant electric current of 400 mA and a constant voltage of 4.1 V.

In each case, the number of tested batteries was 50 and the ratio of destroyed batteries was shown by "%". The tested results are shown in Table 2.

It should be understood from Table 2 that the battery using the separator of the present invention is very safe.

TABLE 2

| Battery | Battery Test | |
|---|---|---|
| | Shutdown temperature (° C.) | Percentage of Shutdown breakdown(%) |
| Example 1 | 124 | 0 |
| Example 2 | 126 | 0 |
| Example 3 | 124 | 0 |
| Example 4 | 125 | 0 |
| Example 5 | 131 | 0 |
| Example 6 | 121 | 0 |
| Example 7 | 130 | 0 |
| Example 8 | 120 | 0 |
| Comparative 1 | 126 | 20 |

As evident from the above description, the separator for the battery in the present invention has an excellent shutdown function and can shut out an electric current even when a battery temperature rises by the external short circuit of the battery.

In addition, the shutdown function can be continued as it is even when the temperature rises and polyolefin attains to a complete melting state. No cracks generate in the ceramic sheet since the ceramic fibers are bonded to each other.

Further, strength of the separator for the battery can be increased by compounding the porous ceramic sheet and polyolefin in comparison with a case of only the ceramic sheet or only a porous resin film. Accordingly, no separator is damaged in assembly of the battery.

What is claimed is:

1. A separator for a battery comprising a porous ceramic sheet formed of ceramic fibers bonded to one another at their points of intersection and a polyolefin bonded to the ceramic sheet and having micropores capable of being impregnated with an electrolyte.

2. The separator for a battery according to claim 1, wherein the ceramic sheet is constituted of ceramic fibers bonded to one another at their points of intersection through sintering.

3. The separator for a battery according to claim 1, wherein the polyolefin has been bonded directly to the ceramic sheet, or bonded to the ceramic sheet via a silane coupling agent.

4. The separator for a battery according to claim 1, wherein the porous ceramic sheet holds the polyolefin within interstice of the ceramic fibers bonded to one another at their points of intersection.

5. The separator for a battery according to claim 1, wherein the ceramic fibers arc constituted of amorphous silica fibers reinforced with one or more fibers selected from the group consisting of alumina fibers, aluminosilicate fibers and aluminoborosilicate fibers.

6. The separator for a battery according to claim 1, wherein the polyolefin is at least one selected from the group consisting of a polyethylene, a polypropylene, an ethylene-propylene copolymer, an ethylene-butene copolymer, an ethylene-hexene copolymer and an ethylene-octene copolymer.

7. The separator for a battery according to claim 1, wherein the polyolefin has been chemically bonded to the ceramic sheet.

8. The separator for a battery according to claim 1, wherein the ceramic fibers have a diameter of at least 0.65 µm and at most 3.0 µm.

9. The separator for a battery according to claim 1, wherein the polyolefin has micropores of at least 0.05 µm and at most 10 µm.

10. The separator for a battery according to claim 1, wherein the polyolefin is in the form of film.

11. The separator for a battery according to claim 10, wherein the film is formed from a liquid containing a polyolefin dissolved or dispersed therein or a polyolefin thin film containing a plasticizer added thereto.

12. The separator for a battery according to claim 1, wherein the micropores have been formed by elution of a pore forming agent within the polyolefin.

13. The separator for a battery according to claim 1, wherein the polyolefin is a modified polyolefin having an acid value in the range from 0.1 to 20.

14. In a battery having a separator incorporated therein, the improvement which comprises using as a separator the separator according to claim 1.

15. In a lithium battery comprising:
 a positive electrode,
 a negative electrode,
 a separator separating the positive electrode and the negative electrode, a positive electrode can contacted with the positive electrode, a negative electrode can contacted with the negative electrode and an electrical insulating gasket, said lithium battery containing an electrolyte, the improvement which comprises using as a separator the separator according to claim 1.

16. The separator for a battery according to claim 1, obtained by:

sintering a boron compound mixed with ceramic fibers to form a porous ceramic sheet comprised of the ceramic fibers bonded to one another at their points of intersection, applying a polyolefin containing a pore forming agent to the ceramic sheet to form a polyolefin layer bonded to the ceramic sheet, and removing the pore forming agent from the polyolefin layer to produce a separator.

17. The separator for a battery according to claim 16, wherein the ceramic fibers are constituted of amorphous silica fibers reinforced with one or more fibers selected from the group consisting of alumina fibers, aluminosilicate fibers and aluminoborosilicate fibers.

18. The separator for a battery according to claim 16, wherein the boron compound is a nonmetal-based boron compound.

19. The separator for a battery according to claim 16, wherein organic fibers have been mixed with the ceramic fibers and the boron compound and have disappeared during the sintering.

20. The separator for a battery according to claim 19, wherein the organic fibers have been mixed with the ceramic fibers and the boron compound in an amount of 5 to 40% by weight based on the total weight of the ceramic filers and the boron compound.

21. The separator for a battery according to claim 16, wherein the boron compound is boron nitride and has been mixed with the ceramic fibers in an amount of 3 to 7.5% by weight based on the total weight of the ceramic fibers.

22. The separator for a battery according to claim 16, wherein said polyolefin is applied to the ceramic sheet through dipping the ceramic sheet into a liquid containing a polyolefin dissolved or dispersed therein.

23. The separator for a battery according to claim 16, wherein said polyolefin is applied to the ceramic sheet through thermally contact-bonding a polyolefin film with the ceramic sheet to obtain a composite sheet of the ceramic sheet and the polyolefin.

24. The separator for a battery according to claim 16, wherein the pore forming agent is selected from the group consisting of silicic acid, calcium silicate, calcium carbonate, talc, dibutyl phthalate, dioctyl phthalate, dinonyl phthalate, dibutyl sebacate, tributyl phosphate and liquid paraffin.

25. The separator for a battery according to claim 1, obtained by sintering a boron compound mixed with ceramic fibers to form a porous ceramic sheet comprised of the ceramic fibers bonded to one another at their points of intersection, dipping the porous ceramic sheet into a liquid containing a polyolefin dissolved or dispersed therein to adhere the polyolefin onto the ceramic fibers, and forming micropores within the interstices of the polyolefin adhered to the ceramic fibers to produce a separator.

26. A separator for a battery comprising a porous ceramic sheet formed of ceramic fibers bonded to one another at their points of intersection and a polyolefin bonded to the ceramic sheet and having micropores capable of being impregnated with an electrolyte, wherein the ceramic sheet has been surface-treated with a silane coupling agent.

27. A separator for a battery comprising a porous ceramic sheet formed of ceramic fibers bonded to one another at their points of intersection and a polyolefin bonded to the ceramic sheet, and having micropores capable of being impregnated with an electrolyte, wherein the polyolefin comprises a modified polyolefin selected from the group consisting of a carboxyl-modified polyolefin, a dicarboxylic anhydride-modified polyolefin and an epoxy-modified polyolefin, or said polyolefin comprises a mixture of the modified polyolefin with an unmodified polyolefin.

28. The separator for a battery according to claim 27, wherein the polyolefin has an acid value not higher than 20 and comprises a modified polyolefin of at least one polyolefin selected from the group consisting of an ethylene polymer, a propylene polymer, an ethylene-propylene copolymer, a polybutene and a poly-4-methylpentene-1, wherein said polyolefin has been modified with an unsaturated dicarboxylic acid, a derivative of an unsaturated dicarboxylic acid or an epoxy-containing vinylic compound.

29. The separator for a battery according to claim 27, wherein the polyolefin has been chemically bonded to the ceramic sheet, directly or via a silane coupling agent having an amino group, through reaction of the carboxyl group, the dicarboxylic anhydride group or the epoxy group of the modified polyolefin with a hydroxyl group on the ceramic fiber, or with the amino group of the silane coupling agent on the surface of the ceramic fiber.

* * * * *